United States Patent [19]
Narad et al.

[11] Patent Number: 5,572,734
[45] Date of Patent: Nov. 5, 1996

[54] METHOD AND APPARATUS FOR LOCKING ARBITRATION ON A REMOTE BUS

[75] Inventors: Charles E. Narad, Santa Clara; Neil MacAvoy, Redwood City, both of Calif.

[73] Assignee: Sun Microsystems, Inc., Mountain View, Calif.

[21] Appl. No.: 432,887

[22] Filed: May 2, 1995

Related U.S. Application Data

[63] Continuation of Ser. No. 766,834, Sep. 27, 1991, abandoned.

[51] Int. Cl.$^6$ .................................................... H04L 12/28
[52] U.S. Cl. ................................................................ 395/726
[58] Field of Search ...................................... 395/375, 800

[56] References Cited

U.S. PATENT DOCUMENTS

| | | | |
|---|---|---|---|
| 4,511,959 | 4/1985 | Nicolas et al. | 395/325 |
| 4,586,128 | 4/1986 | DeWoskin | 395/725 |
| 4,633,394 | 12/1986 | Georgiou et al. | 395/650 |
| 4,760,521 | 7/1988 | Rehwald et al. | 395/425 |
| 4,785,394 | 11/1988 | Fischer | 395/425 |
| 4,787,033 | 11/1988 | Bomba et al. | 395/325 |
| 5,168,568 | 12/1992 | Thayer et al. | 395/725 |

FOREIGN PATENT DOCUMENTS

| | | | |
|---|---|---|---|
| 0291907 | 5/1988 | European Pat. Off. | G06F 15/16 |

OTHER PUBLICATIONS

J. L. Rivero, "Multiple Master Simultaneous Use of a Common Bus By Space Separation", Feb. 1979, *IBM Technical Disclosure Bulletin*, vol. 21, No. 9, pp. 3621–3622.

*Primary Examiner*—Kevin J. Teska
*Assistant Examiner*—Dan Fiul
*Attorney, Agent, or Firm*—Blakely Sokoloff Taylor & Zafman

[57] ABSTRACT

A master bus interconnecting multiple masters is coupled via any number of intervening buses to a slave bus interconnecting multiple slaves and masters. A lock arbiter signal is passed to each successive bus-to-bus interface concurrent with an instruction issued by a master accessing a slave on a remote bus. Address, control, data, and lock arbiter signals are buffered in successive intervening bus-to-bus interfaces including the bus-to-bus interface to the slave bus. The lock arbiter signal when received by the slave bus-to-bus interface will set a lock arbiter register within bus slave bus-to-bus interface. Setting the lock arbiter register once a target slave has been accessed prevents any other master operating on the remote bus from using the remote bus or connecting to the remote bus-to-bus interface. Indivisible sequences of bus operations targeted for the target slave may be confined to the bus to which the target slave is coupled although intervening buses and bus-to-bus interfaces may be disconnected and reassigned pending completion of the indivisible sequence.

30 Claims, 12 Drawing Sheets

METHOD AND APPARATUS FOR LOCKING ARBITRATION ON A REMOTE BUS

This is a continuation of U.S. patent application Ser. No. 07/766,834, filed on Sep. 27, 1991, abandoned Jun. 7, 1995.

RELATED APPLICATIONS

The present invention is related to the following co-pending applications: Ser. No. 07/767,122, entitled "Methods and Apparatus for A Register Providing Atomic Access to Set and Clear Individual Bits of Shared Registers Without Software Interlock"; Ser. No. 07/766,784, entitled "A Bus-To-Bus Interface For Preventing Data Incoherence In A Multiple Processor Computer System"; Ser. No. 07/767,023, entitled "Methods and Apparatus For Dynamically Steering Undirected Interrupts"; and Ser. No. 07/766,835, entitled "A Bus Arbitration Architecture Incorporating Deadlock Detection and Masking".

BACKGROUND OF THE INVENTION

1. Field of the Invention

The present invention relates generally to multiple bus multiple processor computer systems. In particular, the present invention relates to bus arbitration wherein an indivisible sequence of steps may be preserved upon a device operating on a bus remote from the accessing master even though intervening buses may be released prior to the completion of the indivisible sequence of steps.

2. Art Background

Computer systems frequently make use of bidirectional datapaths, generally known as buses. Buses permit the interconnection of various internal and external peripherals such that the devices may communicate with each other. In larger or more complex computer systems, multiple buses may be used to interconnect a large number of devices, including more than one processor. Devices connected to a bus are generally termed either "master" or "slave", depending on whether the device controls, or is controlled by, another device. In computer systems containing multiple buses, it is necessary to provide a mechanism for determining which device will be permitted to access and control a bus, and which device has priority over another device. The mechanism which controls access by a master to a bus, and thus to slave devices connected to such bus, is generally known as bus arbitration. Arbitration may be accomplished either in hardware, or in software, and enables multiple masters to share the use of a single resource. Bus arbitration is generally accomplished by an arbiter using a hardware implementation, accepting requests for access to a bus from all master devices connected to the bus. The arbiter uses some algorithm, such as fixed priority or round-robin, to determine which requesting master will be granted the next available access cycle to use the particular bus.

Occasionally, it will be necessary for a master to retain ownership and control of a bus for an indivisible number of transactions, thereby preventing other masters from accessing and using the bus, pending completion of the indivisible series of steps. The indivisible sequence of steps or transactions is commonly referred to as an "atomic" or "locked" sequence. Atomic sequences are frequently used to ensure that steps or transactions which must be executed sequentially are in fact executed sequentially, without interruption by other masters accessing the bus. For example, in software semaphores, ownership of the semaphore is obtained by a master reading the contents of a memory location, testing its value, then writing changed contents back into that memory location. Ownership of a semaphore could be nullified if another master were permitted to read from the same memory location and attempt to obtain the same semaphore obtained by the first master asserting the semaphore. Thus, the atomic or locked sequence of steps permits a master asserting ownership of a lock to access and control the register performing the lock function, while precluding access to the register by another master.

Atomic sequences are implemented by a mechanism wherein the arbiter is locked in such a way that a master is not granted immediate access to the bus upon request. Arbitration may be locked in one of two ways. The first is where the arbiter recognizes that an access to the bus will include an atomic sequence, wherein the arbiter does not grant the bus to any other master. The second way to lock arbitration is for the arbiter to grant the bus to the accessing master, but where the current controlling master retains some signal indicating that the bus is busy, and until the controlling master releases such signal, no other accessing master can actually control the bus. In the second case, the master receiving the new bus access grant must wait until the bus busy signal controlled by the current master is extinguished. After the bus busy signal is extinguished, the accessing master can assert control of the bus. In either the first or the second cases, an accessing master must wait until the current controlling master completes its transaction on the bus, and thereafter relinquishes control of the bus and extinguishes the bus busy signal. If the current master transaction is a lengthy one, accessing masters must wait, thereby degrading overall performance of the computer system.

As will be described in more detail in the following paragraphs, the present invention provides methods and circuits to permit locking arbitration such that atomic sequences may be transacted on a remote bus without requiring intermediate or intervening buses to remain locked to a master attempting such atomic sequence, thereby improving system performance. Moreover, the present invention enables such atomic sequences to be transacted upon a remote bus without risk of compromising the atomic sequence. By ensuring that atomic sequences targeted for a remote bus remains secure, coherence of data or signals between masters and slaves operating on different buses is preserved.

SUMMARY OF THE INVENTION

Methods and apparatus for locking arbitration to preserve atomic sequences on remote buses are disclosed. Multiple bus-to-bus interfaces provide means of translating protocols and passing the atomic transaction through any number of intervening buses until the target bus is reached, and maintaining atomicity on the target bus or device even where intervening buses are released. As presently preferred, a master on the first bus issues an access instruction together with a signal that the transaction is the beginning of an atomic sequence. A first bus-to-bus interface then initiates a transaction on the second bus and, when having obtained ownership and control of the second bus, transmits the transaction to a second bus-to-bus interface. The access instructions passed to the second bus-to-bus interface also includes a signal that the transaction is the beginning of an atomic sequence. In addition, a signal is passed to the second bus-to-bus interface to lock arbitration on a third target bus. The second bus-to-bus interface will, if the access to the third bus is of long latency, instruct the intervening second bus to "disconnect and retry later". The first bus-to-bus interface will then propagate the "disconnect and retry later" command to the first bus causing the master to relinquish the first bus and retry later. If the access to the third target bus is of only short duration, no such disconnect and retry signal is sent to the second bus. Having received the access request to the third target bus, the second bus-to-bus interface will issue the transaction request to a target device operating on the target bus, and will also lock arbitration as to the third target bus. Where the second bus-to-bus interface has issued a disconnect and retry signal, the first and second buses may, together with masters operating on such buses, request use of such buses or slaves operating on the buses. Initiation of an atomic sequence targeted for the remote third bus will cause the arbiter within the second bus-to-bus interface to remain locked until the accessing master asserting the atomic sequence has obtained ownership of the remote bus, reconnected to the target device operating on the target bus and retrieved data intended for the accessing master. If the access by a master to the target device on the remote bus is the final transaction in an atomic sequence, the accessing master will issue an "unlock arbitration" command along with the transaction. When the final operation to the target device is completed the second bus-to-bus interface releases its internal arbiter locking the third bus, and passes the completion status back to the accessing master through the second and the first buses. Accordingly, atomicity on a remote bus and device is maintained, even though intervening buses may be released and transactions not part of an atomic sequence executed thereon.

BRIEF DESCRIPTION OF THE DRAWINGS

The objects, features, and advantages of the present invention invention will be apparent in the following detailed description in which.

DETAILED DESCRIPTION OF THE INVENTION

Methods and apparatus for locking arbitration on remote buses to preserve atomic sequences are disclosed. In the following description, for purposes of explanation, specific numbers, times, signals etc., are set forth in order to provide a thorough understanding of the present invention. However, it will be apparent to one skilled in the art that the present invention may be practised without these specific details. In other instances, well known circuit and devices are shown in block diagram form in order not to obscure the present invention unnecessarily.

In the following description, reference is made to bus-to-bus interfaces used to control access by masters operating on one bus to slaves, operating on that or another bus. Although bus-to-bus interfaces may be of any generally known construction, it is specifically intended that the bus-to-bus interface taught by co-pending application Ser. No. 07/766, 784, entitled "A Bus-to-Bus Interface for Preventing Data Incoherence In a Multiple Processor Computer System," will be used in the preferred embodiment of the present invention. The above referenced bus-to-bus interface is configured with internal bus protocol conversion hardware, and implements a hardware arbitration methodology. Representative examples of the bus-to-bus interface intended for use with the present invention are manufactured by Sun Microsystems, Inc., Mountain View, Calif., and interconnect Sun Microsystems MBus, SBus, and commercial standard VMEbus datapath systems.

Figure 1:
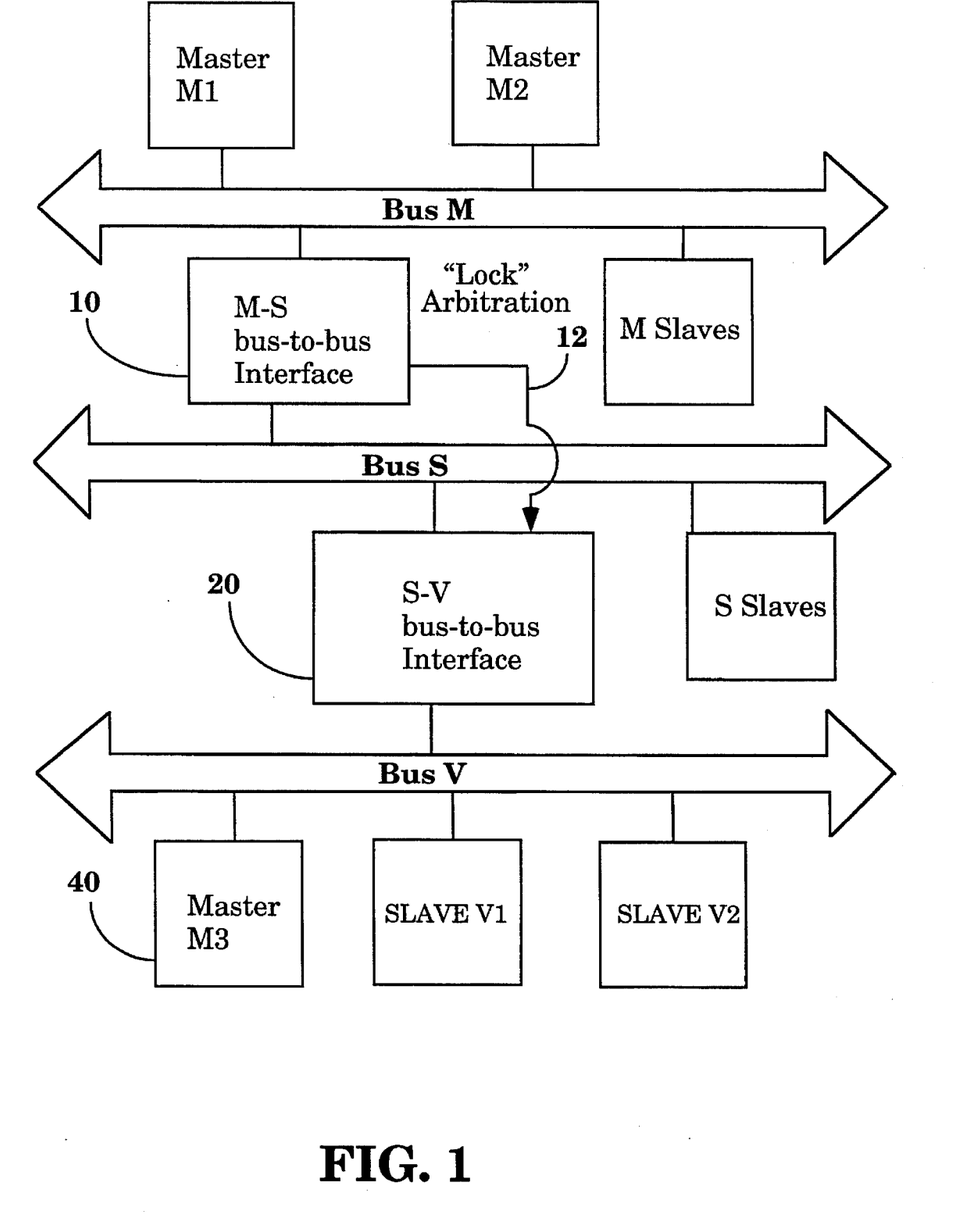
FIG. 1 illustrates a block diagram of multiple bus-to-bus interfaces implementing locking arbitration on remote buses.

Referring now to FIG. 1, a block diagram illustration of the bus-to-bus interfaces implementing the present invention is shown. In FIG. 1, a first bus, Bus M, interconnects multiple masters as well as slaves. A second bus, Bus S, interconnects a number of slave devices. A first bus interface 10 interconnects Bus M to Bus S, and serves to translate bus protocols from Bus M to Bus S, and from Bus S to Bus M. Bus-to-bus interface 10 also includes master-slave directory hardware to permit identification of masters operating on Bus M to slaves operating on Bus S, as more particularly set forth in above-cited co-pending application Ser. No. 07/766, 784 entitled "A Bus-to-Bus Interference for Preventing Data Incoherence in a Multiple Processor Computer System". Also shown in FIG. 1 is a third bus, Bus V, which serves to interconnect a number of masters and slaves operating on Bus V. Interconnecting Bus S to Bus V is a second bus-to-bus interface 20 which also contains bus protocol conversion hardware for communication between Bus S and Bus V as well as Bus S access recognition hardware. Because bus arbitration is well known, specific details regarding bus arbitration will not be described in the present description. For detailed information on bus arbitration, the reader is referred to F. Briggs and K. Hwang, *Computer Architecture and Parallel Processing* (1984).

Bus-to-bus interfaces 10 and 20 also incorporate the "relinquish and retry" features described in cited co-pending application Ser. No. 07/766,784. Briefly described, the "relinquish and retry" features, also known as RERUN and RERUN-ACKNOWLEDGE, permit bus-to-bus interfaces 10 and 20 to command accessing masters and buses when a target device is presently occupied and not available for access at a present time to relinquish the bus and retry access later. RERUN and RERUN-ACKNOWLEDGE permit accessing masters to free-up intervening buses so that overall system performance is not degraded pending completion of a long latency task. The technique of accessing a slave by a master, followed by the disconnection of the master pending slave completion, and then reconnection to the slave by the master to retrieve data from the slave is frequently referred to as a "split cycle".

Each bus in FIG. 1, when accessed as a slave from another bus, as well as each slave operating on a bus, is assigned a unique address or range of addresses. Identification of devices by address space is well known in the art and will not be described here. When a master operating on a bus attempts to access a slave operating on that bus or another remote bus, the master issues an access command including the address of the target device or bus. In addition, the accessing master may issue a "LOCK ARBITRATION" signal which is sent during the address phase to the bus to which the target device is connected, indicating that the following instruction is the beginning of an atomic or locked sequence of operations. In the presently preferred embodiment, the LOCK ARBITRATION signal is sent via a private wire 12 between the first bus-to-bus interface 10 and second bus-to-bus interface 20. However, LOCK ARBITRATION signal could, equally well be transmitted via any shared datapath signal line within system buses, provided that the particular bus protocol utilized supports a signal. The LOCK ARBITRATION signal instructs bus-to-bus interface 20 to lock its arbiter, or if it does not contain the arbiter, to hold a BUS BUSY ("BBSY") signal asserted, once ownership of Bus V is obtained. LOCK ARBITRATION is asserted during the address cycle issued by bus-to-bus interface 10 when accessing bus-to-bus interface 20. Further, in the presently preferred embodiment, the LOCK ARBITRATION signal issued on Bus M is asserted during every transaction of an atomic sequence, rather than every transaction except the last. Ordinarily, a master would signal the end of an atomic sequence by not sending a "LOCK ARBITRATION" signal with the final instruction of the atomic sequence. With particular reference to the Sun Microsystems MBus, however, the LOCK ARBITRATION signal is asserted for all transactions, including the last. The preferred embodiment restricts atomic sequences to read-followed-by-write. Therefore, a READ operation issued with a LOCK ARBITRATION command will cause the arbiter to lock. Analogously, a WRITE operation with LOCK ARBITRATION is recognized as a command to UNLOCK ARBITRATION on the final target bus (Bus V in this case), after completion of the WRITE operation. Bus-to-bus interface 10 will then unlock Bus M arbiter, making Bus M available for use by other masters. In addition, all transaction requests include signals for address, transaction type, transaction size, and data (if required for a WRITE operation).

Figure 2:
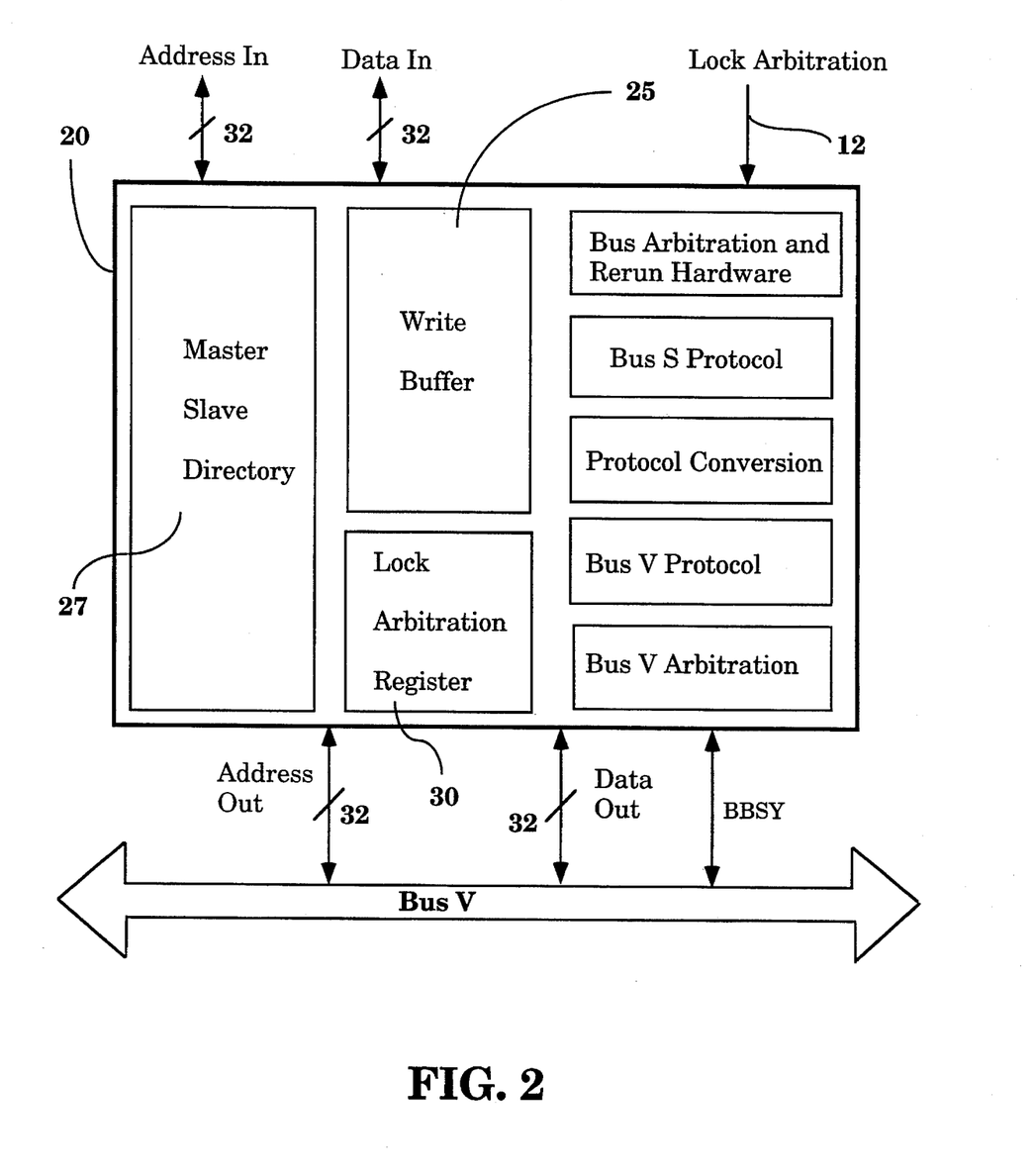
FIG. 2 illustrates in block diagram form, the internal aspects of a bus-to-bus interface.
Figure 3A:
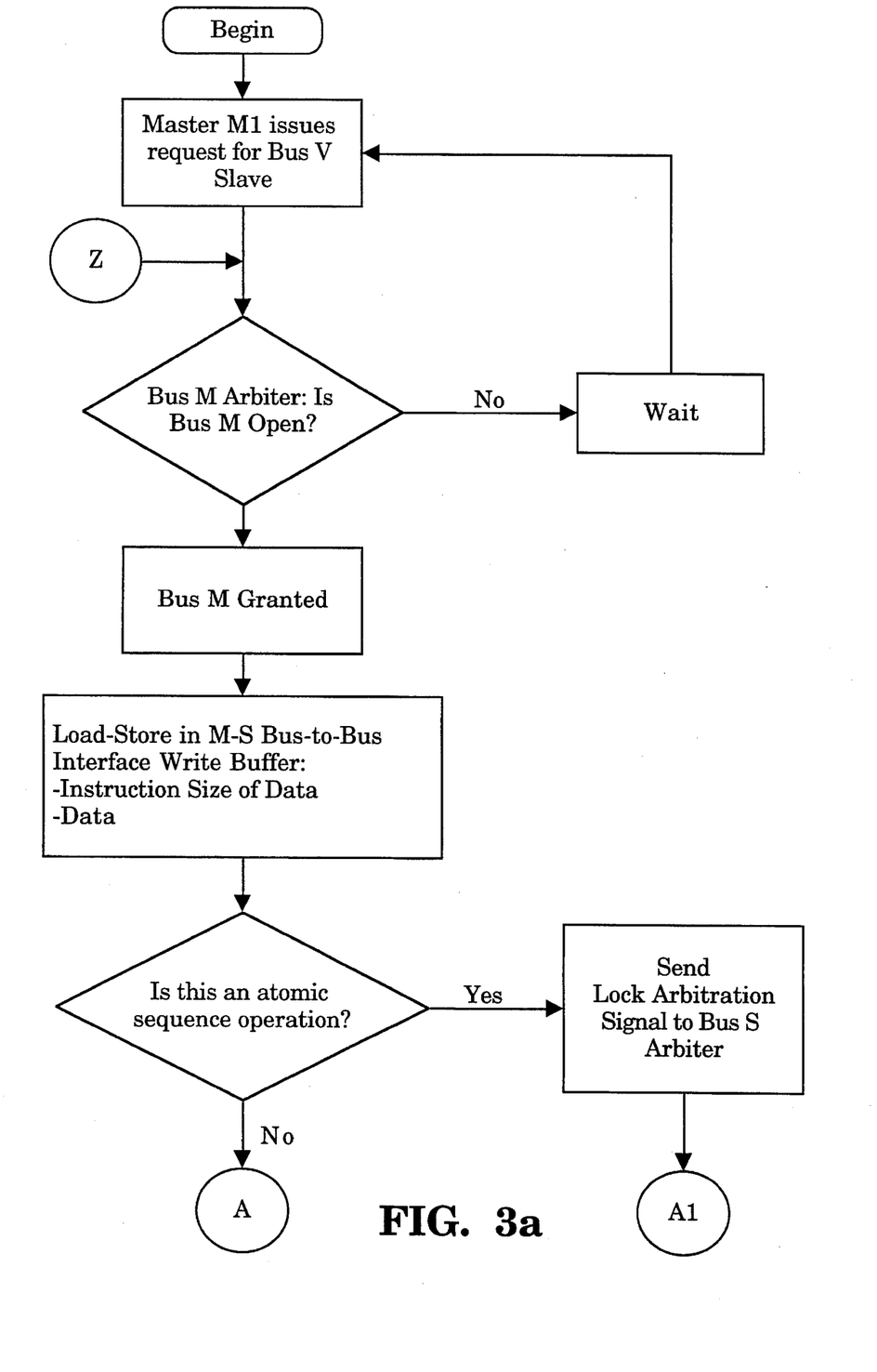
FIGS. 3a–e illustrate a flow-chart of the remote bus locking arbitration method disclosed.
Figure 3B:
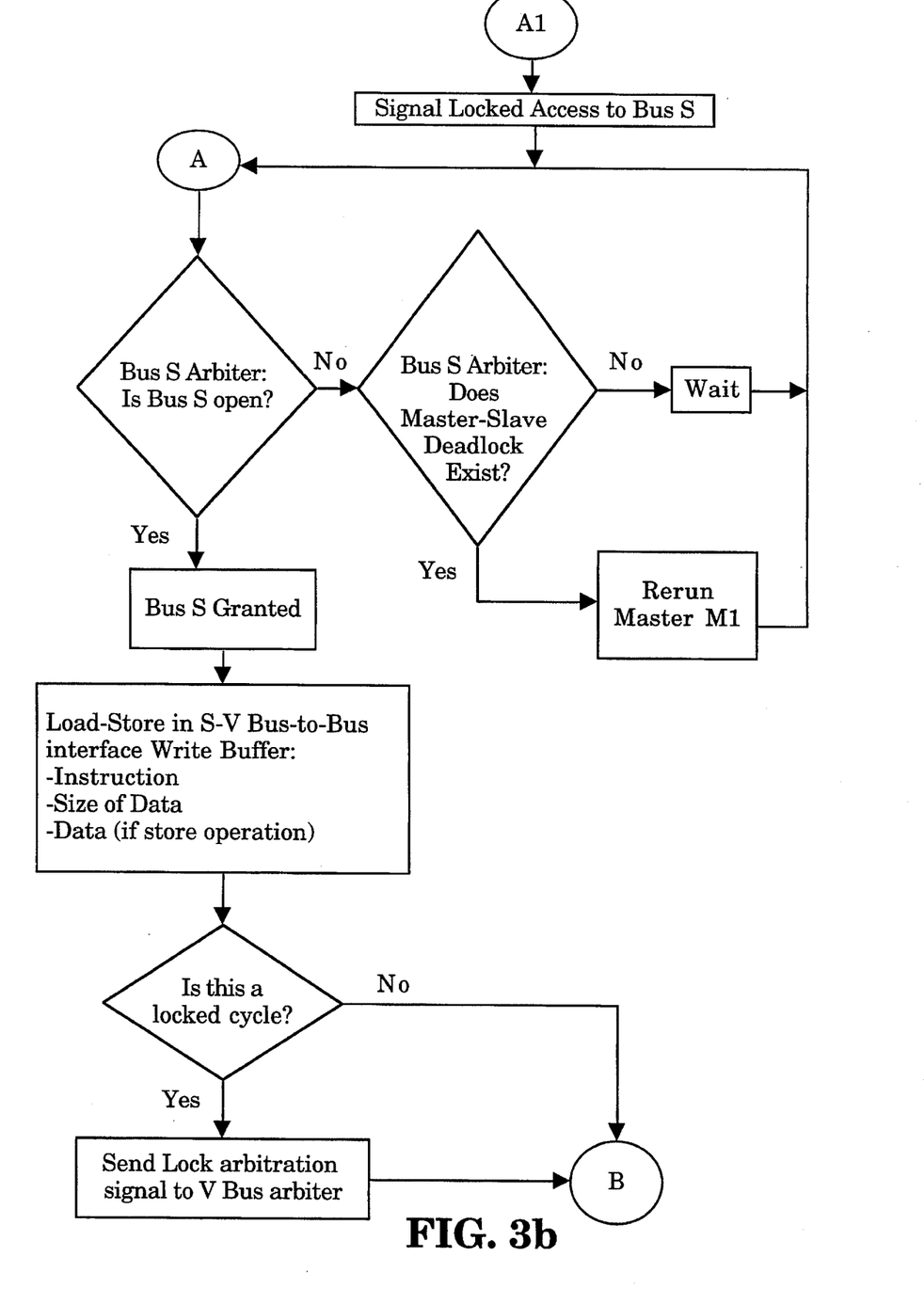
Figure 3C:
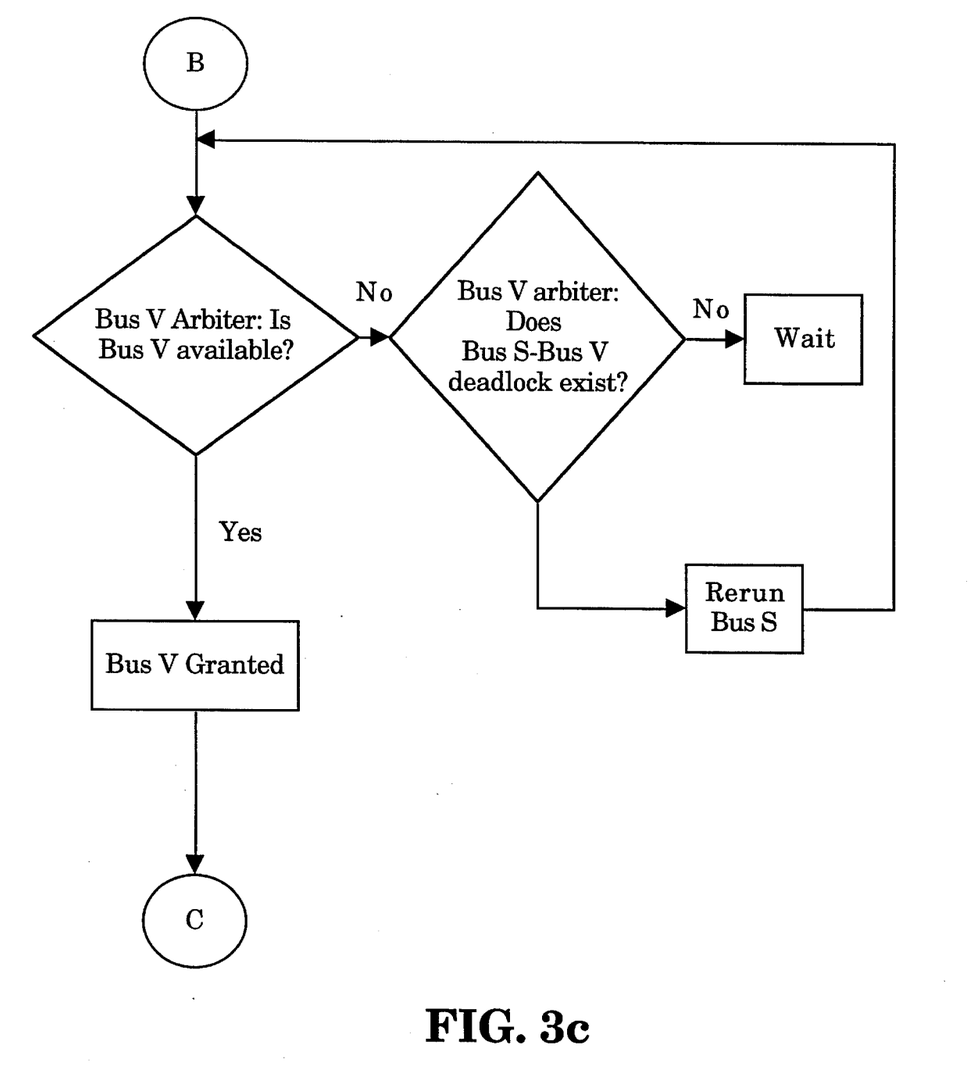
Figure 3D:
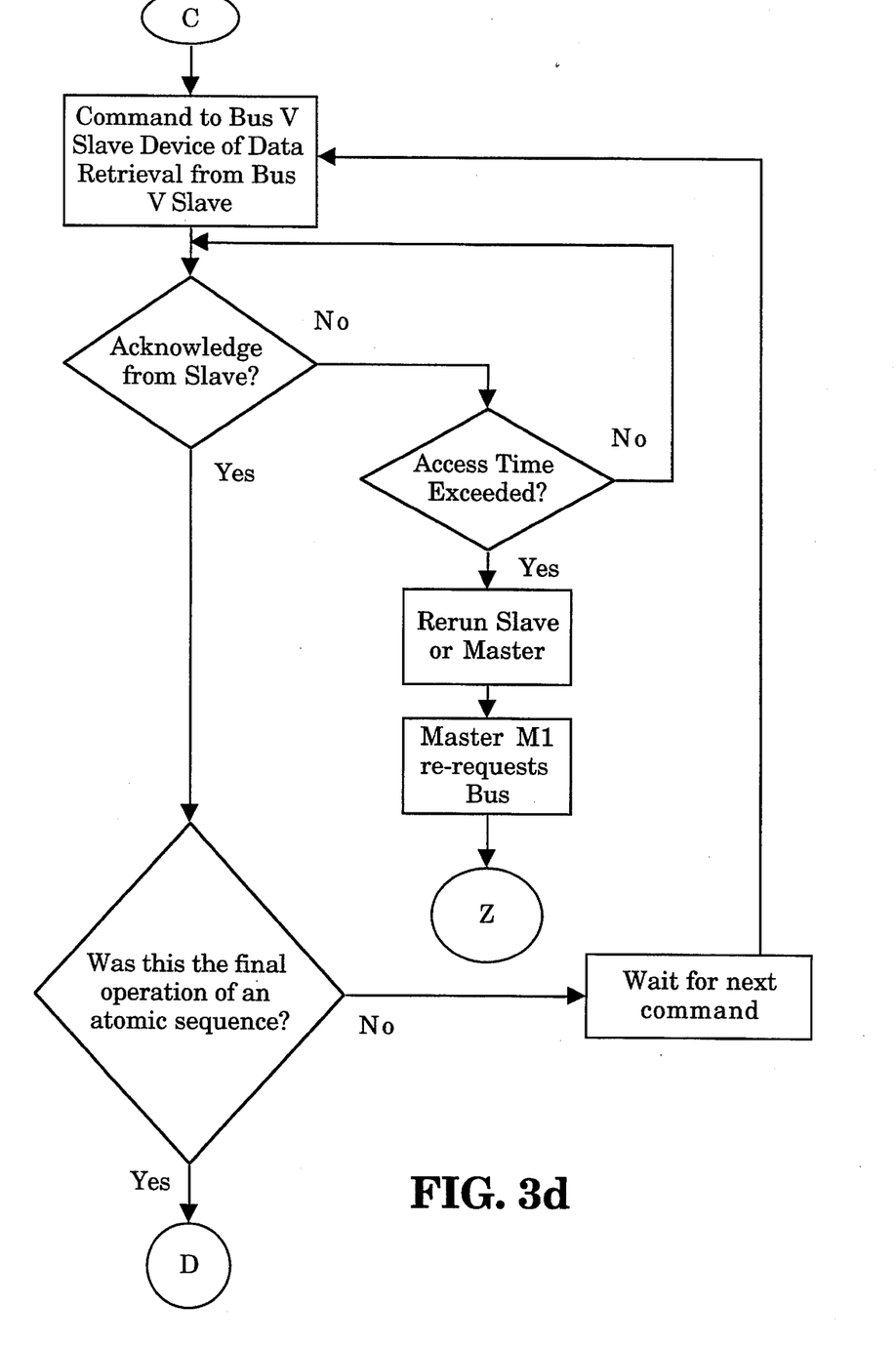
Figure 3E:
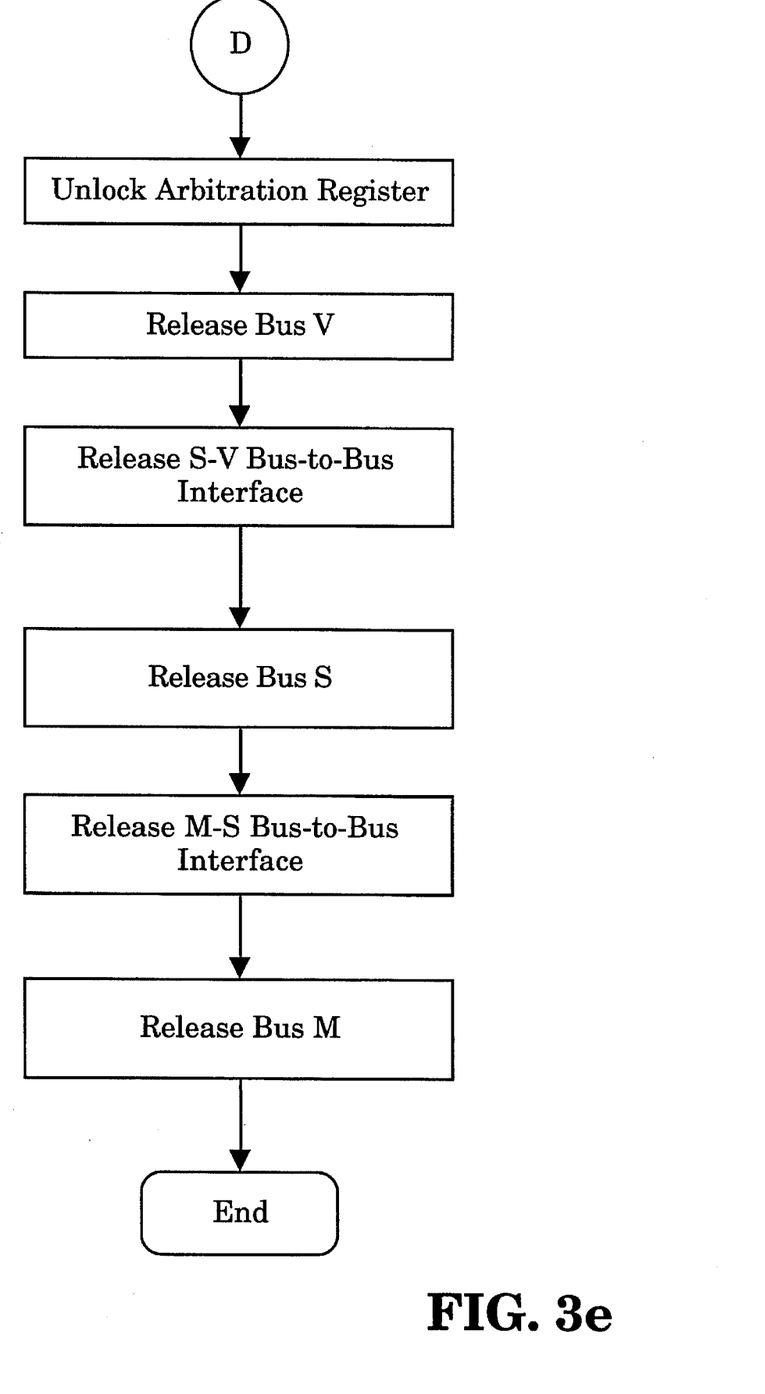

Referring now to FIG. 2, a block diagram of bus-to-bus interface 20 is shown. In FIG. 2, bus-to-bus interface 20 is shown to contain arbitration and rerun modules for both Bus S and Bus V. Bus-to-bus interface 20 can issue a RERUN to Bus S, but in the present embodiment Bus V has no rerun mechanism itself. Bus S and Bus V protocol modules, as well as protocol conversion hardware, is also contained within bus-to-bus interface 20. A write buffer 25 receives and stores data and status signals issued by a master during its access cycle to bus-to-bus interface 20. Once the master has issued such access cycle and data, the master may then be commanded to disconnect, whereupon write buffer 25 will retain all signals and conditions necessary to complete the transaction. A lock arbiter register 30 receives the LOCK ARBITRATION signal sent over private wire 12 from bus-to-bus interface 10. Unlike bus-to-bus interface 10, bus-to-bus interface 20 does not have a master-slave directory to provide master identification information for masters operating on Bus V, to provide "slave busy" signals to accessing masters on either Bus M or Bus S. Instead, bus-to-bus interface 10 performs the function on behalf of 20; that is, for most purposes bus-to-bus interface 20 appears to 10 to be just another S-slave. Bus-to-bus interface 20 also has bidirectional address and data input and output lines associated with each bus. As presently preferred, Bus S masters cannot access Bus V, so the directory is not necessary.

With reference to both FIGS. 1 and 2, operation of the remote bus locking feature will now be described. When a master operating on Bus M seeks to issue an instruction to a target slave operating on Bus V, the master will issue its access command together with address identifying the target slave, size of data transferred, data if it is a write operation, and whether the ensuing transaction is an atomic sequence. If the ensuing transaction is an atomic sequence, the LOCK ARBITRATION signal will be asserted. Bus M accepts the master's access cycle, and grants Bus M to the master. The bus-to-bus interface 10 will recognize the target address asserted as assigned to a valid device operating on a bus connected to bus-to-bus interface 10. Interface 10 will capture all comments, data, and status signals discussed above. Bus-to-bus interface 10 will then arbitrate for control of Bus S. Once Bus S arbiter grants control of Bus S to bus-to-bus interface 10, interface 10 will issue the address and transaction as latched to the second bus-to-bus interface 20. Bus-to-bus interface 20 passes the access to Bus V, and allows slaves on that bus to determine if they are being accessed. Bus-to-bus interface 20 will store transaction address, type, data, and status signals in write buffer 25. In addition, bus-to-bus interface 10 sends via its private wire 12 the LOCK ARBITRATION signal to the lock arbitration register 30 contained in bus-to-bus interface 20, indicating that the sequence of transactions ensuing is an atomic sequence. When lock arbitration register 30 is set, Bus V arbitration is locked so that control of Bus V remains only with bus-to-bus interface 20. That is, no other device can operate as a master on Bus V as long as lock arbitration register 30 is set. Therefore, for example, Bus V master M3 40 is precluded from accessing any Bus V slaves, and indivisible transaction steps intended for a device operating on Bus V are ensured to remain indivisible. If it is determined that the particular sequence of transactions have exceeded a certain predetermined period of time, bus-to-bus interface 20 will instruct the accessing master to relinquish Bus S and retry access later. If, as in the present discussion, the accessing master is bus-to-bus interface 10, the RERUN command will cause bus-to-bus interface 10 to relinquish control of Bus S and to issue a rerun command on Bus M to the accessing master. By providing that a master may issue a LOCK ARBITRATION signal together with other pertinent transaction data, atomic sequences are permissible on remote buses even though intervening buses, as in the case of Bus S and Bus M, are released for alternative use by other masters. By freeing-up intervening buses such as Bus S and Bus M, overall system performance can be remarkably improved in computer systems where the latency period for a slave access can extend for many tens, hundreds, or perhaps thousands of instruction cycles.

Referring briefly to FIG. 3, a flow-chart illustrating the locking of arbitration on a remote bus is shown. In FIG. 3, it is seen that control of the instruction issued by accessing Master M1 is passed sequentially to bus-to-bus interfaces 10 and 20, until bus V Slave device is reached.

As was discussed above and in connection with co-pending application Ser. No. 07/766,784 entitled "A Bus-to-Bus Interface for Preventing Data Incoherence in a Multiple Processor Computer System", the RERUN command and retry cycles are well known in the field and need not be discussed in detail. However, it must be noted that once a master, including bus-to-bus interface 10 or 20 operating as a master, disconnects from an accessed slave, the master must reassert itself in a retry cycle to reconnect to the slave and retrieve data or signals from the slave. Any master disconnecting from a slave or bus in connection with the RERUN command will retry access and connect to such slave at a later time in accordance with its particular rerun and rerun acknowledge construct. In essence then, bus-to-bus interface 20 operates in the fashion of a packet switch bus, wherein a transaction acknowledge is returned sometime after the transaction is initiated, even though the bus itself is configured to operate as a circuit switch bus. Ordinarily, a circuit switch bus will remain on the bus until the transaction has been completed, and the accessing device has received the transaction acknowledge signal. For purposes of discussion with respect to the present invention, bus-to-bus interfaces 10 and 20 may be considered to operate as packet switch buses with the provision that the accessing master, including interfaces 10 and 20, must initiate the reconnection by executing a retry cycle to complete a transaction begun earlier and during which the master was commanded to rerun.

Figure 4A:
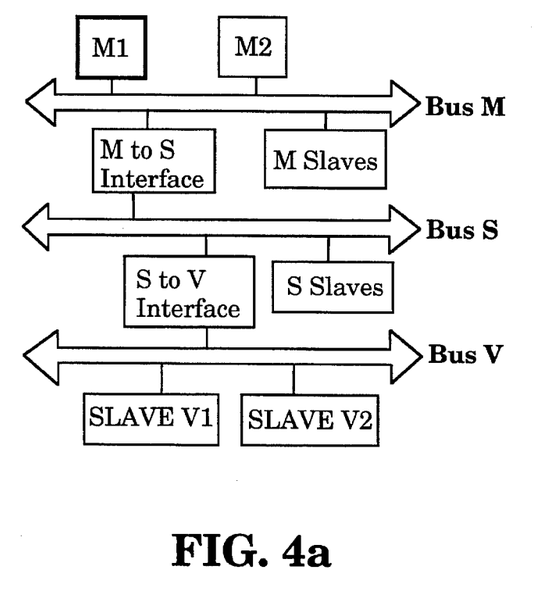
FIGS. 4a–4j illustrate an exemplary atomic access operation wherein an intervening bus is freed.
Figure 4B:
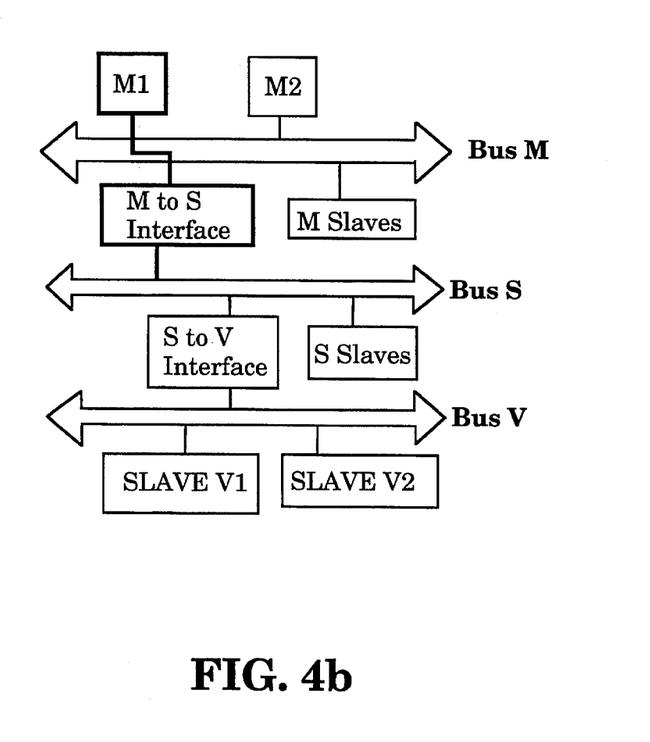
Figure 4C:
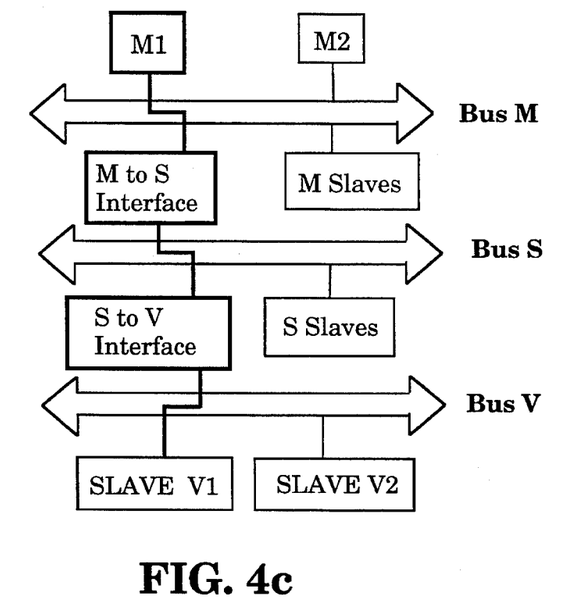
Figure 4D:
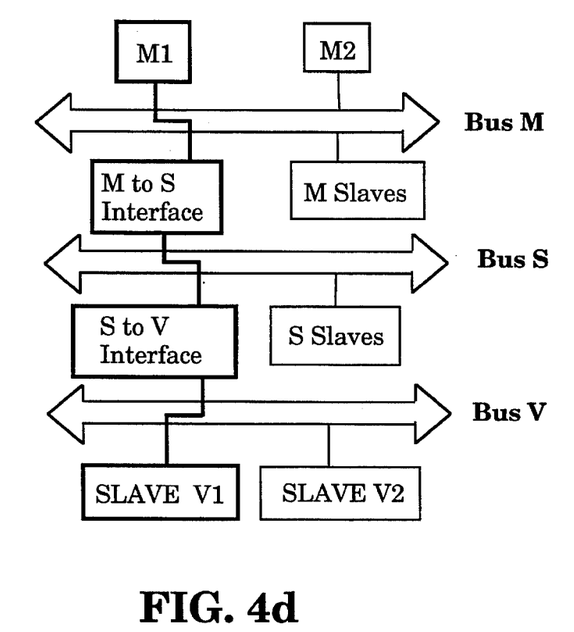

In order to permit a better understanding of the invention which is the subject of the present application, the following example will describe the commands and data transfer between masters, bus interfaces, and remote slaves during an atomic sequence. With reference to FIGS. 4a–j, assume that Master M1 issues an access request for Slave V1 on remote Bus V. For purposes of explanation, an atomic sequence of READ followed by WRITE will be described. Master M1 issues a request for use of Bus M. When the Bus M arbiter determines that the bus is available it issues a grant to Master M1. As shown in FIG. 4a, Master M1 then issues a READ command targeted for Slave V1 operating on Bus V, along with an indication on Bus M that this access is part of a LOCKED sequence. Once access is issued to Bus M, bus-to-bus interface 10 will recognize that the access is targeted to a device on Bus S, and will request access to Bus S from the Bus S arbiter. If Bus S is not available bus-to-bus interface 10 will issue a RERUN command to Master M1. If, however, Bus S is available, bus-to-bus interface 10 will be granted control of Bus S as a master and thus have access to bus-to-bus interface 20 (FIG. 4b). Bus-to-bus interface 10 having control of Bus S, bus-to-bus interface 10 will execute an access to bus-to-bus interface 20 indicating a READ instruction along with address and size of data. At the same time the LOCK ARBITRATION signal, passed from bus-to-bus interface 10 through private wire 12, will cause lock arbitration register 30 within bus-to-bus interface 20 to be set (FIG. 4c). Once lock arbitration register 30 is set, and bus-to-bus interface 20 has obtained control of Bus V, no other master device on Bus V can access Bus V and therefore cannot access any device operating on Bus V until such lock is cleared. Following the recognition of the READ access, bus-to-bus interface 20 will issue the access to the intended slave on Bus V. Bus-to-bus interface 20 will connect to Slave V1 (FIG. 4d), and the READ command will be issued to Slave V1. If the access exceeds the maximum allowable time permitted, bus-to-bus interface 20 will command the bus-to-bus interface 10 to RERUN. The bus-to-bus interface 20 will then continue the access to slave V1 autonomously. Because lock arbitration register 30 of bus-to-bus interface 20 is set, any other device attempting to access a device on Bus V will be rejected. Bus-to-bus interface 20 will remain connected to Bus V and thus to Slave V1 as long as required to complete the transaction in question, in this case a READ. Once the READ has been accomplished, Slave V1 will wait until Master M1 re-establishes connection to Slave V1 in order to receive data retrieved during the READ operation.

Figure 4E:
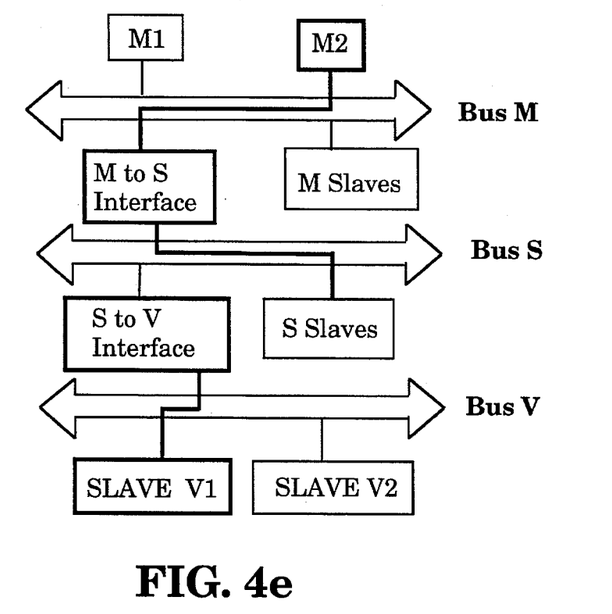

Pending completion of the READ by the slave and reconnection of Master M1 seeking to retrieve the read data, other devices may use the freed buses Bus M and Bus S. For example, Master M2 may control slaves on Bus S (FIG. 4e). It should be noted that the accessing master must re-establish connection through all of the steps previously described in connection with Master M1 initially accessing Slave V1. During the time that Master M1 is disconnected pursuant to a RERUN and Slave V is performing the access, bus-to-bus interface 10 prevents other masters on Bus M from accessing Bus V. In particular, the lock on Bus V arbitration prevents other masters on Bus V from using Bus V.

Figure 4F:
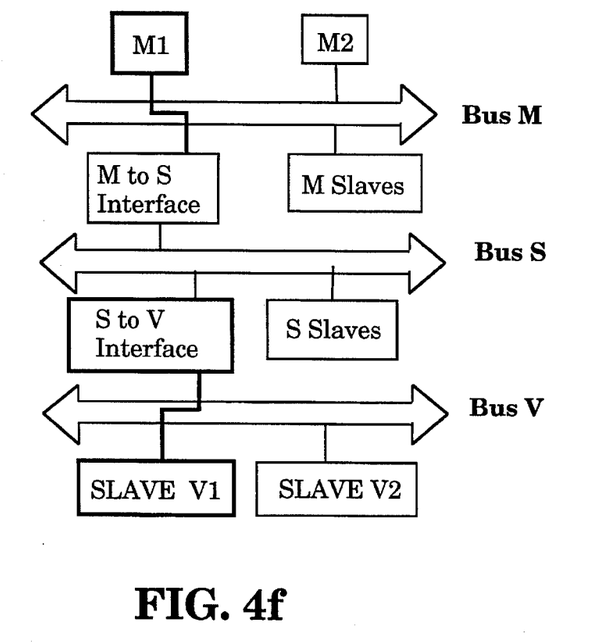
Figure 4G:
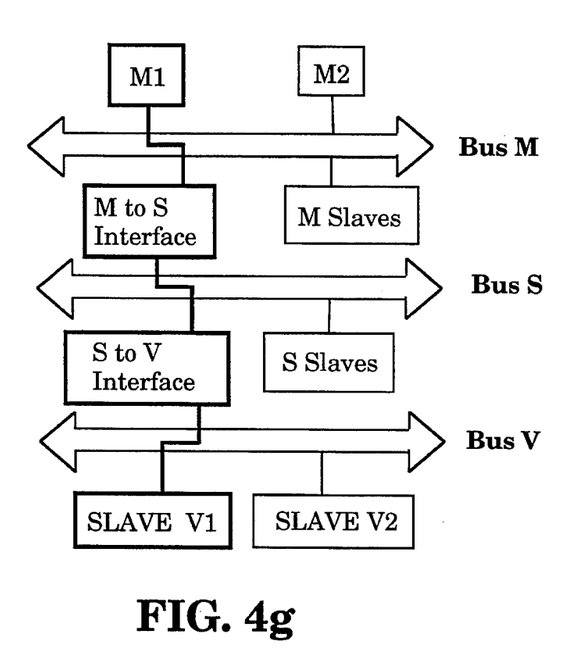

Continuing now with the second half of the example of atomic READ followed by WRITE, master M1 now issues a WRITE instruction, together with data intended for Slave V1. As described above, Master M1 has already regained control of Bus M1 (FIG. 4f), in order to complete the first operation. Master M1 then sends the next operation in the locked sequence to Bus M, then bus-to-bus interface 10, then Bus S, and then bus-to-bus interface 20 (FIG. 4g), each time passing the WRITE instruction together with size of the data, plus the data itself. The LOCK ARBITRATION signal is transmitted along with the WRITE command even though the WRITE will be the final operation of the atomic sequence. Recall from the above discussion that bus-to-bus interface 20 has retained control of Bus V throughout this atomic sequence. The Bus V arbiter remains locked, preventing any other master from accessing Bus V. Locking the Bus V arbiter does not preclude changing of target devices on Bus M or Bus S. Master M1, having reconnected to bus-to-bus interface 20, subsequently writes the intended data to write buffer 25 of interface 20.

Figure 4H:
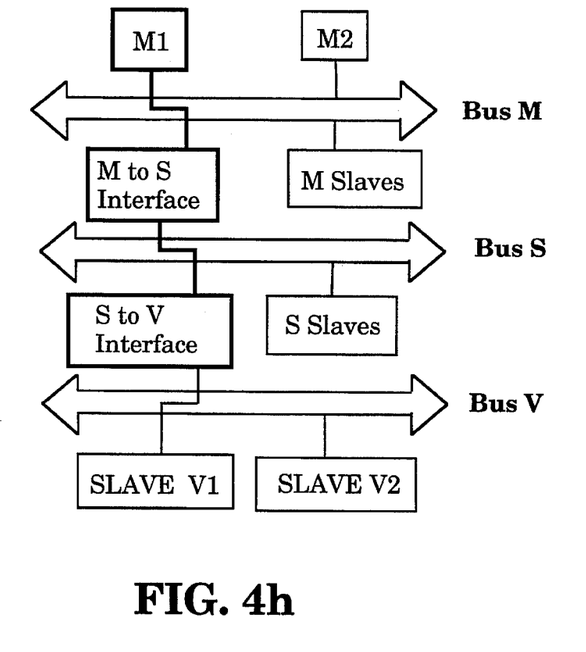
Figure 4I:
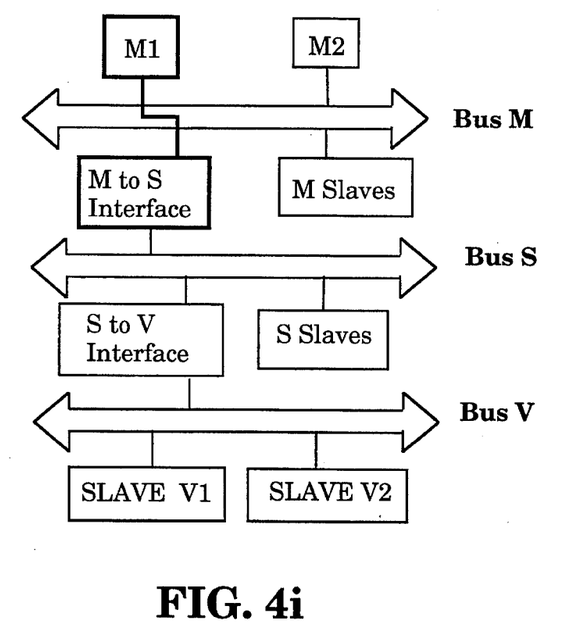
Figure 4J:
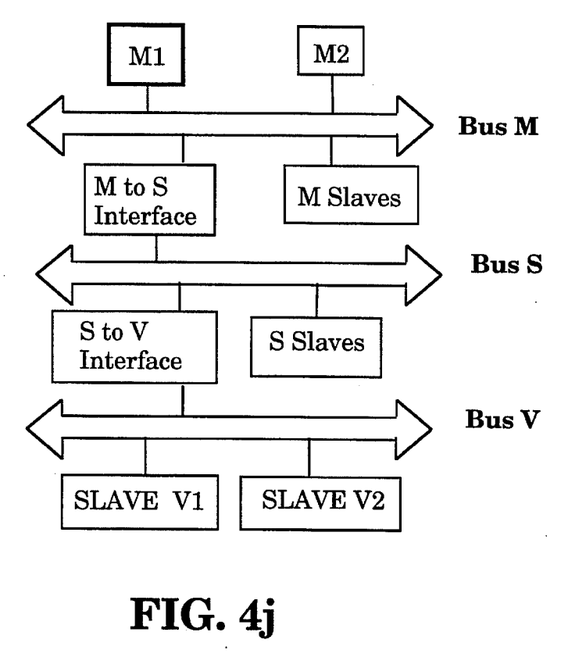

Bus-to-bus interface 20 having stored the data to be written to Slave V1, together with the address and size information, then writes data from write buffer 25 to slave device V1. After the WRITE command has been executed, and because the WRITE command was the final operation of the atomic sequence, bus-to-bus interface 20 will unlock the lock arbitration register 30, and thereafter release Bus V together with the slave V1 (FIG. 4h). Recall that, although WRITE is the final atomic access transaction and is accompanied by a LOCK ARBITRATION signal, the bus arbiter recognizes WRITE as the final step and therefore unlocks the Bus V arbiter following WRITE. Having released Bus V, bus-to-bus interface 20 will deassert the BBSY signal, thereby permitting another master to gain control of Bus V through Bus V arbiter. It should be noted there is a state machine associated with the arbiter, such that any LOCK ARBITRATION signal passed by bus-to-bus interface 10 to bus-to-bus interface 20 is included in the arbitration decision granting control of Bus V to the accessing master. Having been set, the state machine will remain set until conditions necessary for release of the bus are satisfied. One of the conditions for release of Bus V is that S-V bus-to-bus interface 20 has not sampled a condition that interface 20 is to lock Bus V arbiter pursuant to a bus request from a remote master. If S-V bus-to-bus interface 20 has sampled a LOCK ARBITRATION request issued by a remote master, Bus V arbiter will not assign Bus V to any other device, the state machine latching the condition that LOCK ARBITRATION is set. Thus, even though no pending data requests exist for devices connected to Bus V, Bus V still remains locked to bus-to-bus interface 20 as a result of the arbiter latching the LOCK ARBITRATION signal. Finally, S-V bus-to-bus interface 20 is released by M-S bus-to-bus interface 10 (FIG. 4i), followed by Master M1 releasing bus-to-bus interface 10 (FIG. 4j).

The foregoing has described the methods and apparatus for locking arbitration of a remote bus to preserve atomic sequences. Pending completion of the atomic sequence, intervening buses within a multiple bus computer system employing the present invention may be released without affecting atomicity on the locked remote bus. (i.e., prior to completion of the indivisible sequence of bus operations) It is contemplated that changes and modifications may be made by one of ordinary skill in the art, to materials and arrangement of elements in the present invention without departing from the spirit and scope of the invention.

We claim:

1. In a multiple processor, multiple bus computer system having a first bus, a second bus and a remote target slave bus intercoupled to a plurality of bus-to-bus interfaces, a method for preserving an indivisible sequence of bus operations on said remote target slave bus while contemporaneously releasing the first bus and the second bus for use by other devices within the computer system, said method comprising the steps of:

issuing a slave access signal including an operation command by an accessing master on the first bus directed to a target slave;

issuing an atomic sequence signal, together with the slave access signal, said atomic sequence signal indicating that an indivisible sequence of bus operations is beginning;

intercoupling said accessing master on the first bus to a multiplicity of buses;

initiating a transaction on the second bus by a first bus-to-bus interface, said first bus-to-bus interface coupling the first bus and the second bus;

using a remote target slave bus to couple a remote target slave bus-to-bus interface to a target slave, said remote target slave bus-to-bus interface coupling the second bus with the remote target slave bus;

transmitting the transaction along with the atomic sequence signal to the remote target slave bus-to-bus interface by the first-bus-to-bus interface when the first bus-to-bus interface has obtained control of the second bus;

receiving and storing the slave access signal and transaction on the remote target slave bus-to-bus interface;

transmitting a lock arbitration signal to the remote target slave bus-to-bus interface to lock arbitration on the remote target slave bus, thereby reserving said remote target slave bus for use only by the accessing master to access the target slave;

reserving said remote target slave bus for use only by said accessing master to access said target slave by transmitting a lock arbitration signal to the remote target slave bus-to-bus interface to lock arbitration on the remote target slave bus, relinquishing the first bus, the second bus, the first bus-to-bus interface connecting said accessing master to said remote target slave bus-to-bus interface prior to completion of said indivisible sequence of bus operations, thereby releasing the first bus, the second bus, the first bus-to-bus interface for access by a master other than said accessing master during said indivisible sequence of bus operations; and relinquishing the remote target slave bus and remote target slave bus-to-bus interface after said accessing master issues a final operation of the indivisible sequence of bus operations.

2. The method as set forth in claim 1, wherein reserving said remote target slave bus is accomplished by preventing arbitration for a master other than said accessing master.

3. The method as set forth in claim 1, wherein reserving said remote bus is accomplished by preventing arbitration for a master other than said accessing master.

4. The method as set forth in claim 3, wherein setting said lock arbiter register is accomplished by said accessing master issuing the lock arbitration signal, the first bus, the second bus and the first bus-to-bus interface thereafter transmitting said lock arbitration signal to said remote target slave bus-to-bus interface.

5. The method as set forth in claim 4, wherein setting said lock arbiter register is accomplished by said accessing master issuing a lock arbitration signal, said buses and bus-to-bus interfaces thereafter transmitting said lock arbitration signal to said remote bus-to-bus interface.

6. The method as set forth in claim 5, wherein setting said lock arbiter register further comprises setting said lock arbiter register according to said lock arbitration signal accompanying particular bus operations during said indivisible sequence of bus operations.

7. The method as set forth in claim 5, wherein said lock arbitration signal is transmitted with said slave access signal.

8. The method according to claim 1, wherein said accessing master, buses, and bus-to-bus interfaces except said remote bus-to-bus interface are relinquished according to a relinquish and retry signal issued by said remote bus-to-bus interface.

9. The method according to claim 1, wherein said accessing master, the first bus, the second bus and the first bus-to-bus interface but not said remote target slave bus-to-bus interface are relinquished according to a relinquish and retry signal issued by said remote target slave bus-to-bus interface.

10. A bus interface system for preserving an indivisible sequence of bus operations on a remote target slave bus within a multiple processor computer system, said bus interface system comprising:

an accessing master capable of issuing a slave access signal including a first operation of said indivisible sequence of bus operations;

a multiplicity of buses intercoupled to said accessing master;

a plurality of bus-to-bus interfaces including a remote target slave bus-to-bus interface intercoupling said multiplicity of buses, said bus-to-bus interfaces receiving and storing said slave access signal;

a target slave coupled via a remote target slave bus to said remote target slave bus-to-bus interface;

if said target slave receives the first operation of said indivisible sequence of bus operations, then said remote target slave bus-to-bus interface issues a relinquish and retry signal thereby sequentially disconnecting said accessing master, said multiplicity of buses, and said bus-to-bus interfaces from said remote target slave bus-to-bus interface prior to completion of said indivisible sequence of bus operations.

11. The method as set forth in claim 1, wherein reserving said remote target slave bus for use only by said target slave comprises locking arbitration for said remote target slave bus according to said lock arbitration signal.

12. The method according to claim 1 wherein said lock arbiter register remains in a set state until after said accessing master issues the final operation of said indivisible sequence of bus operations, said method further comprising the following additional steps:

issuing a retry command by said accessing master to re-access said target slave;

sequentially recoupling said accessing master to the first bus, the second bus and the first bus-to-bus interface, and remote target slave bus-to-bus interface;

performing said final operation by said target slave;

sequentially disconnecting said remote target slave bus, said bus-to-bus interfaces including said remote target slave bus-to-bus interface and first bus-to-bus interface, and said accessing master from said target slave; and clearing said lock arbiter register.

13. A bus interface system for preserving an indivisible sequence of bus operations on a remote target slave bus within a multiple processor computer system, said circuit comprising:

an accessing master issuing a target slave access signal;

a multiplicity of buses intercoupled to said accessing master;

a plurality of bus-to-bus interfaces including a remote target slave bus-to-bus interface intercoupling said multiplicity of buses, said bus-to-bus interfaces receiving and storing said slave access signal;

a target slave coupled via a remote target slave bus to said remote target slave bus-to-bus interface;

when said target slave receives a first operation of said indivisible sequence of bus operations, said remote target slave bus-to-bus interface issuing a relinquish and retry signal causing said accessing master, buses, and bus-to-bus interfaces to sequentially disconnect from said remote target slave bus-to-bus interface.

14. The bus interface system as set forth in claim 13, wherein said remote bus-to-bus interface sets said lock arbiter register according to said lock arbitration signal accompanying particular operations of said indivisible sequence of bus operations.

15. The bus interface system as set forth in claim 14, wherein said remote target slave bus-to-bus interface further comprises a lock arbiter register, wherein setting said lock arbiter register prevents arbitration.

16. The bus interface system as set forth in claim 15, wherein said buses and said bus-to-bus interfaces thereafter sequentially transmit said lock arbitration signal to said remote target slave bus-to-bus interface when said accessing master issues a lock arbitration signal.

17. The bus interface system as set forth in claim 13, wherein said accessing master issues said lock arbitration signal with said slave access signal during said indivisible sequence of bus operations.

18. The bus interface system as set forth in claim 17, wherein said remote target slave bus-to-bus interface sets said lock arbiter register when said lock arbitration signal accompanies a READ operation.

19. The bus interface system as set forth in claim 18, wherein said remote target slave bus-to-bus interface clears said lock arbiter register when said lock arbitration signal accompanies a WRITE operation.

20. The bus interface system according to claim 12, wherein:

said lock arbiter register remains set until after said accessing master issues a final operation of said indivisible sequence of bus operations;

said accessing master reissues said slave access signal previously issued to reaccess said target slave;

said accessing master sequentially reaccesses said plurality of buses, bus-to-bus interfaces, and remote bus-to-bus interface;

said target slave executes said final operation;

said remote bus, said bus-to-bus interfaces including said remote bus-to-bus interfaces, and said accessing master sequentially disconnect from said target slave, and said lock arbiter register is cleared.

21. In a computer system comprising a master bus interconnected to a slave bus via a plurality of bus-to-bus interfaces, a bus interface system for preserving on a remote target slave bus an indivisible sequence of bus operations issued by an accessing master coupled to said master bus, said indivisible sequence of bus operations intended for execution by a target slave coupled to said slave bus, said system comprising:

a first bus-to-bus interface coupled to said master bus and to said slave bus for receiving and storing a slave access signal including an operation command and a lock arbitration signal issued by said accessing master;

a second bus-to-bus interface including a lock arbiter register, said second bus-to-bus interface coupled to said slave bus and to said remote target slave bus, said second bus-to-bus interface receiving and storing said slave access signal and lock arbitration signal;

if said target slave receives a first operation of said indivisible sequence of bus operations, then said second bus-to-bus interface issues a relinquish and retry signal thereby sequentially disconnecting said accessing master, buses, and master bus-to-bus interface from said second bus-to-bus interface prior to completion of said indivisible sequence of bus operations.

22. The bus interface system as set forth in claim 21, wherein said second bus-to-bus interface reserves said slave bus for use only by said accessing master by asserting a bus busy signal.

23. The bus interface system according to claim 22, wherein:

said accessing master issues a retry command to reaccess said target slave;

said accessing master sequentially reaccesses said plurality of buses, bus-to-bus interfaces, and remote target slave bus-to-bus interface;

said target slave executes said final operation;

said remote target slave bus, said bus-to-bus interfaces including said remote target slave bus-to-bus interfaces, and said accessing master sequentially disconnect from said target slave, and clearing said lock arbiter register.

24. In a computer system comprising a master bus interconnected to a slave bus via a plurality of bus-to-bus interfaces, a bus interface system for preserving on a remote target slave bus an indivisible sequence of bus operations issued by an accessing master coupled to said master bus, said indivisible sequence of bus operations intended for execution by a target slave coupled to said slave bus, said system comprising:

a first bus-to-bus interface coupled to said master bus for receiving and storing a slave access signal and a lock arbitration signal issued by said accessing master;

a second bus-to-bus interface including a lock arbiter register coupled to said target slave via said slave bus and via at least one intervening bus, said second bus-to-bus interface receiving and storing said slave access signal and lock arbitration signal;

when said target slave receives a first operation of said indivisible sequence of bus operations, said second bus-to-bus interface issuing a relinquish and retry signal causing said accessing master, buses, and master bus-to-bus interface to sequentially disconnect from said second bus-to-bus interface.

25. The bus interface system as set forth in claim 24, wherein said lock arbiter register, when set, prevents arbitration on said remote target slave bus.

26. The bus interface system as set forth in claim 25, wherein said lock arbiter register is set when said lock arbitration signal accompanies a READ operation.

27. The bus interface system as set forth in claim 25, wherein said lock arbiter register is cleared when said lock arbitration signal accompanies a WRITE operation.

28. The bus interface system as set forth in claim 21, wherein said accessing master issues said lock arbitration signal with said slave access signal during said indivisible sequence of operations.

29. The bus interface system as set forth in claim 21, wherein said buses and bus-to-bus interfaces except said remote bus-to-bus interface may be accessed by a master other than said accessing master after said second bus-to-bus interface issues said relinquish and retry signal during said indivisible sequence of bus operations.

30. The bus interface system according to claim 21, wherein:

said lock arbiter register remains set until after said accessing master issues a final operation of said indivisible sequence of bus operations;

said accessing master reissues said slave access signal previously issued to reaccess said target slave;

said accessing master sequentially reaccesses said buses and bus-to-bus interfaces;

said target slave performs said final operation;

said remote bus, said bus-to-bus interfaces including said second bus-to-bus interfaces, and said accessing master sequentially disconnect from said target slave, and said lock arbiter register is cleared.

* * * * *